(12) United States Patent
Pursifull et al.

(10) Patent No.: US 9,242,531 B2
(45) Date of Patent: Jan. 26, 2016

(54) VEHICLE CLIMATE CONTROL METHOD

(75) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 803 days.

(21) Appl. No.: 13/421,565

(22) Filed: Mar. 15, 2012

(65) Prior Publication Data

US 2013/0239599 A1    Sep. 19, 2013

(51) Int. Cl.
*B60H 1/32*    (2006.01)
*B60H 1/00*    (2006.01)

(52) U.S. Cl.
CPC ........ *B60H 1/00764* (2013.01); *B60H 1/00849* (2013.01); *B60H 1/00864* (2013.01); *B60H 2001/327* (2013.01)

(58) Field of Classification Search
CPC ............ B60H 1/3208; B60H 1/00764; B60H 1/00849; B60H 1/00864; B60H 1/327

USPC .......................................... 62/133, 186, 228.1
See application file for complete search history.

(56) References Cited

U.S. PATENT DOCUMENTS

| | | | |
|---|---|---|---|
| 4,823,555 A * | 4/1989 | Ohkumo | 62/133 |
| 5,749,236 A | 5/1998 | Tavian et al. | |
| 6,092,376 A * | 7/2000 | Lake et al. | 62/133 |
| 6,341,494 B1 * | 1/2002 | Isobe et al. | 62/186 |
| 6,715,303 B2 | 4/2004 | Masuda et al. | |
| 7,275,378 B2 * | 10/2007 | Errington et al. | 62/133 |
| 7,357,176 B2 * | 4/2008 | Yelles | 165/271 |
| 2012/0000211 A1 * | 1/2012 | Kwon et al. | 62/61 |

* cited by examiner

*Primary Examiner* — Jonathan Bradford
*Assistant Examiner* — Elizabeth Martin
(74) *Attorney, Agent, or Firm* — Julia Voutyras; Alleman Hall McCoy Russell & Tuttle LLP

(57) ABSTRACT

A method for controlling a climate control system is disclosed. In one example, the climate control system includes an air mixing valve that is adjusted in response to a energy conversion device load demand. The method may provide improved climate control in a vehicle cabin during high energy conversion device load conditions.

2 Claims, 6 Drawing Sheets

VEHICLE CLIMATE CONTROL METHOD

FIELD

The present description relates to a method for operating a vehicle climate control system. The method may be particularly useful for managing the environment of a vehicle cabin when the vehicle is operated at high loads.

BACKGROUND AND SUMMARY

Climate control systems have long been provided in vehicles to improve driver comfort during driving. A driver may select a desired cabin temperature via a control panel. The climate control system heats and/or cools air in the cabin to provide the driver selected desired cabin temperature. In one example, cabin air is heated by passing air over a heat exchanger that contains heated engine coolant and distributing the air in the vehicle cabin. Cabin air may also be cooled by passing air over an evaporator and directing cooled air to the cabin. Air around the evaporator is cooled when liquid coolant changes to a gas in the evaporator thereby absorbing heat from the surrounding air. The gas in the evaporator is then compressed to a liquid and heat in the liquid is released to an area outside the cabin.

The air that is cooled or heated may be drawn from outside of the vehicle or from inside the vehicle. Air from outside the cabin is often directed to the evaporator or the heat exchanger because the outside air replaces stale cabin air. Nevertheless, during very warm ambient temperature days, it may be desirable to recirculate air within the cabin to provide lower cabin temperatures as compared with when air from outside the cabin is circulated in the cabin.

Climate control systems improve occupant comfort but they may also reduce vehicle performance since a portion of output from an engine and/or motor is used to operate the climate control system. As a result, vehicle performance may be reduced when a climate control system is activated. One way to mitigate a reduction in vehicle performance due to a climate control system is to deactivate or reduce output from the climate control system during high load conditions. For example, when a driver demand a high level of torque from a motor or engine, an air conditioner compressor may be temporarily deactivated in response to the high level of torque requested by the driver. However, cabin comfort may be reduced during high load conditions since air conditioner output is reduced. Thus, there may be competing requirements between increasing vehicle wheel torque and providing comfort for a driver in the vehicle cabin.

The inventors herein have recognized the above-mentioned disadvantages and have developed a method for controlling a vehicle climate system, comprising: adjusting an air mixing valve state and a compressor in response to a energy conversion device load greater than a threshold.

By adjusting an air mixing valve and a compressor in response to a energy conversion device load greater than a threshold, it may be possible to reduce a load on a climate control system and extend the time that cabin air can be cooled. For example, during a humid day, 40% of an air conditioner load may result from dehumidifying air passing over an evaporator rather than cooling the air. Consequently, the cooling capability of an evaporator may be extended when the air mixing valve is adjusted to recirculate a higher percentage of air in a vehicle cabin.

In one example, an air mixing door in the vehicle heating ventilation and air conditioning (HVAC) system is closed when an engine torque production request is greater than a threshold so that a percentage of air circulating in a vehicle cabin and over an evaporator is increased. In other words, a higher percentage of air that is already in the cabin is circulated over an evaporator. In another example, the air mixing door is closed when engine intake manifold vacuum is greater than a threshold so that a percentage of air circulating in a vehicle cabin and over an evaporator is increased. In these ways, reduction in air conditioner compressor output may be made less noticeable to a driver. Without such operation reduction in air conditioner compressor output may be readily sensed by cabin occupants as an increase in temperature and humidity.

The present description may provide several advantages. Specifically, the approach may improve air conditioning system response. In addition, the approach may simplify system design since a complex system model may be unnecessary. Further, the approach may reduce the possibility of introducing phase oscillations that may be caused by long system delays.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
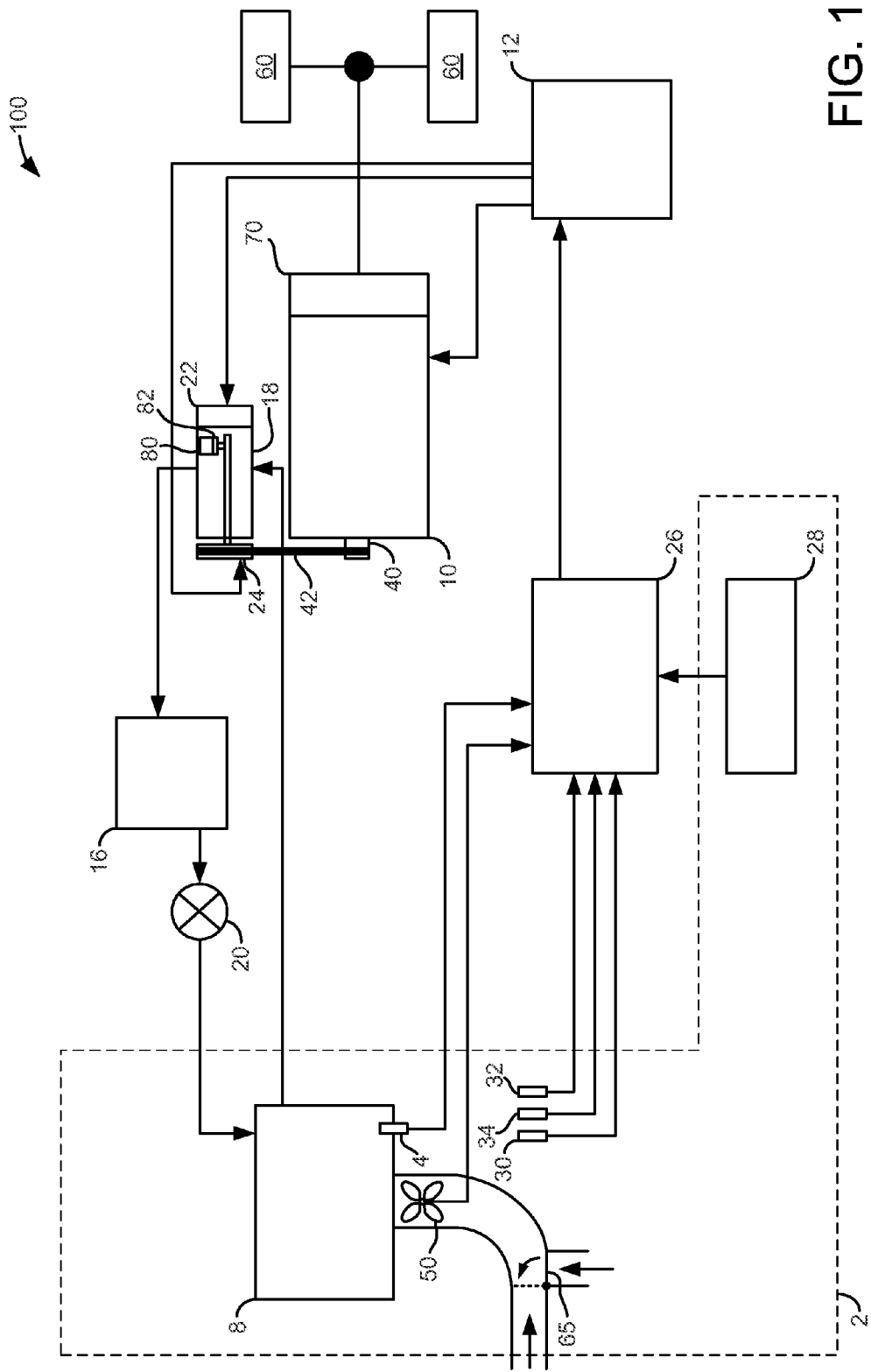
FIG. 1 is a schematic diagram of a vehicle air conditioning system.
Figure 2:
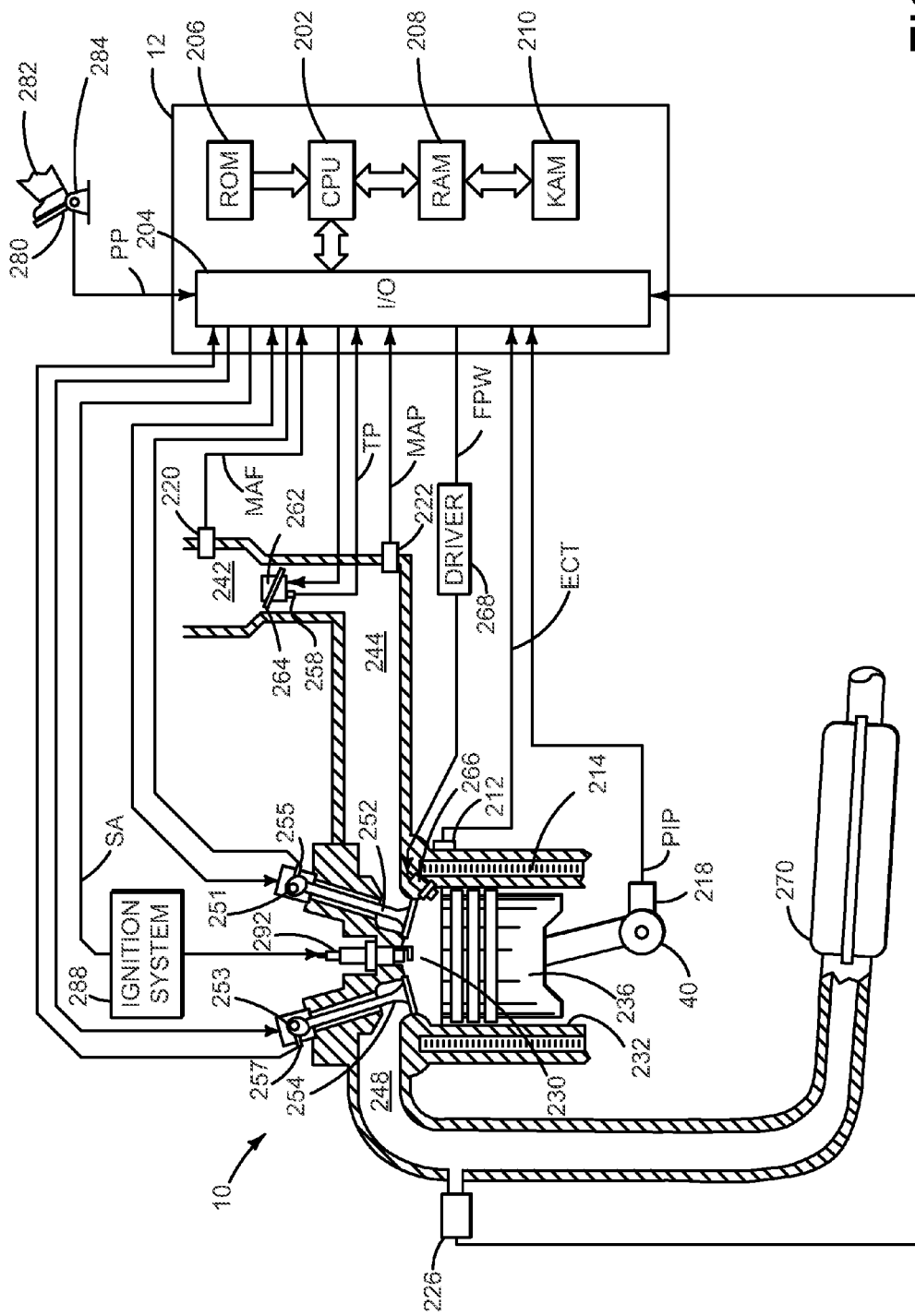
FIG. 2 is a schematic diagram of the energy conversion device of FIG. 1 where the energy conversion device is an engine.
Figure 3:
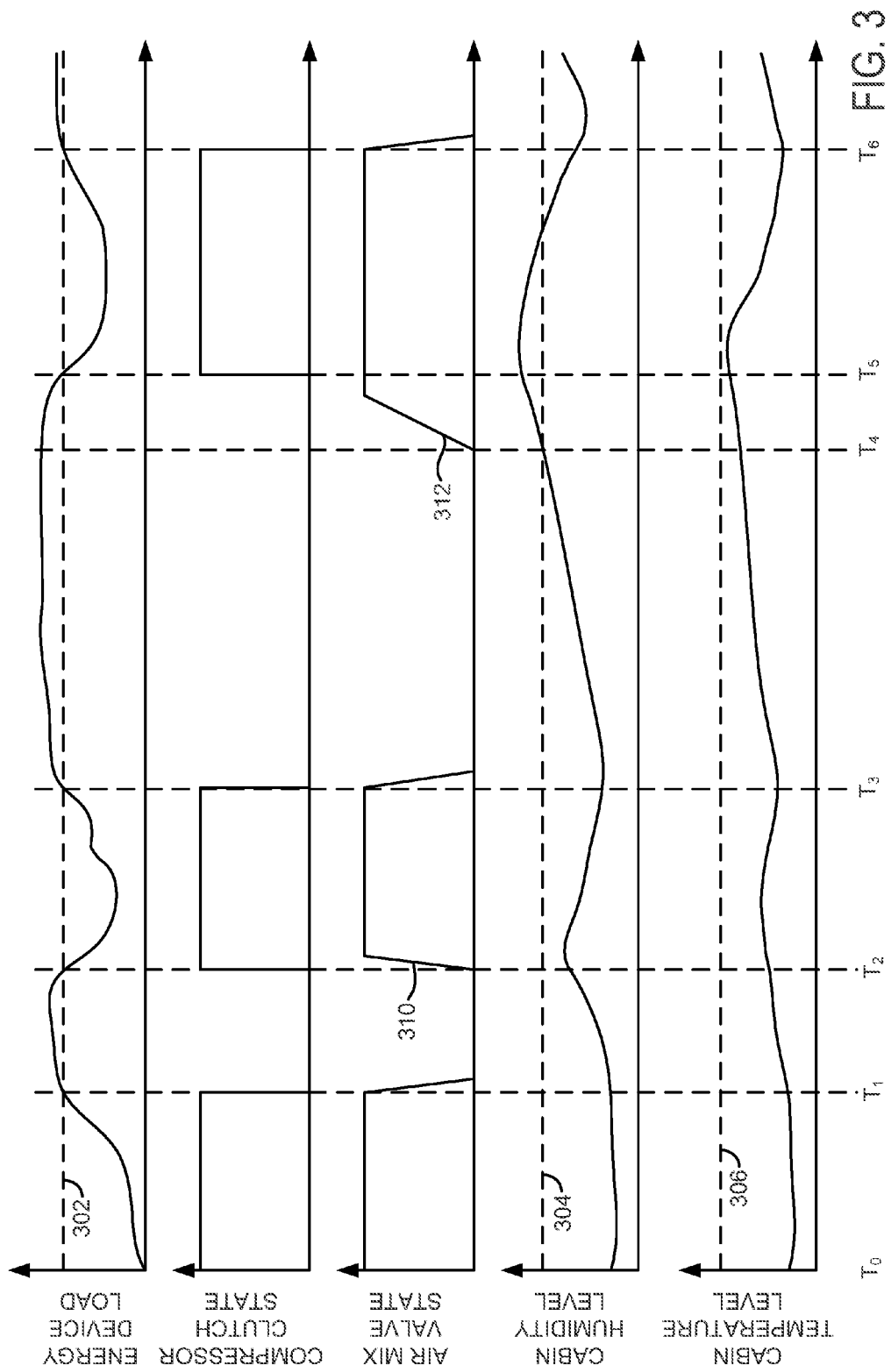
FIGS. 3-5 are simulated operating sequences of interest when the method of FIG. 6 is executed in the systems shown in FIGS. 1 and 2.
Figure 4:
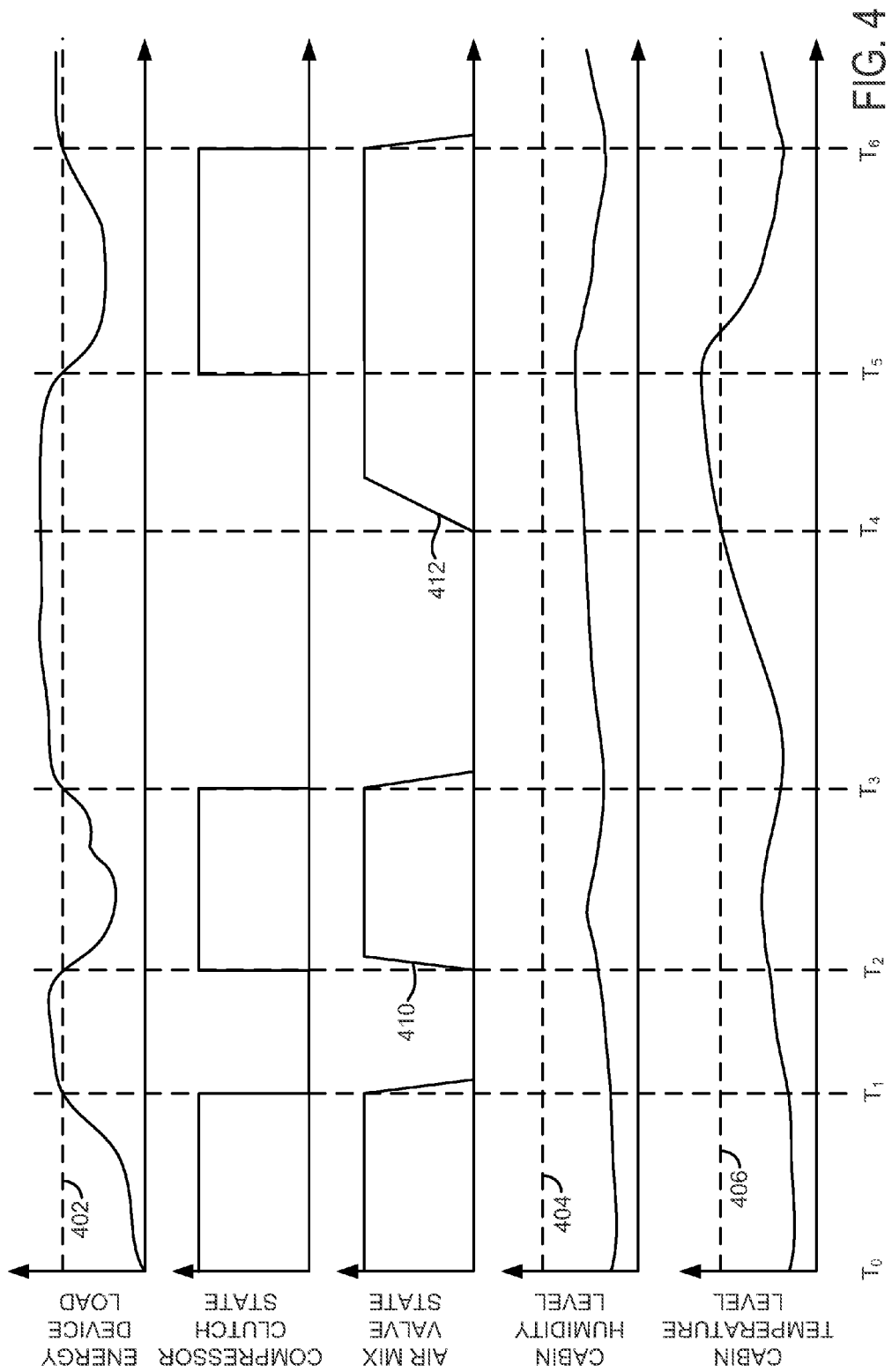
Figure 5:
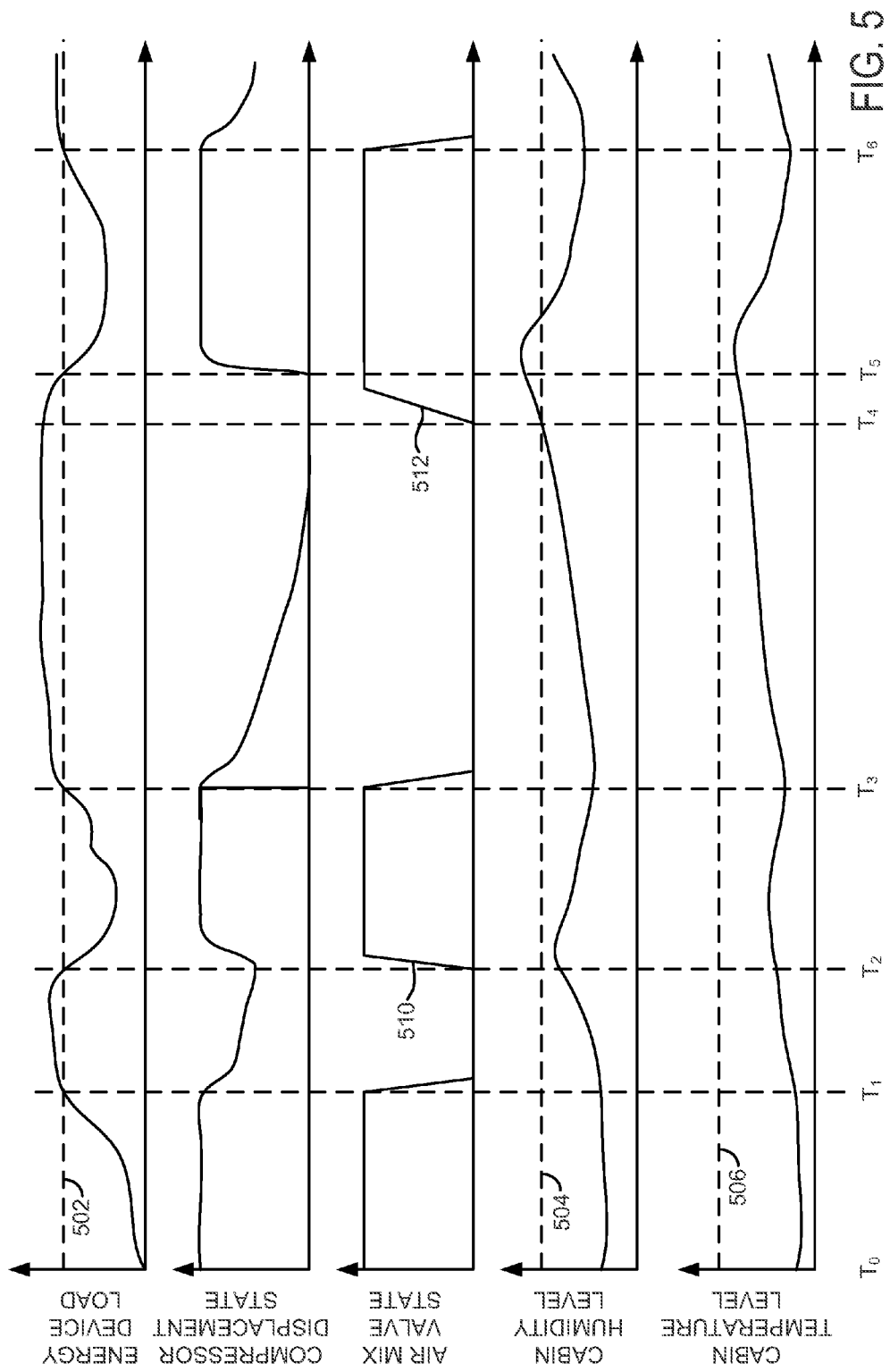

The present description is related to controlling an air conditioning system of a vehicle. In one non-limiting example, the air conditioning system may be configured as illustrated in FIG. 1. Further, a portion of a climate control system may be coupled to an engine of a vehicle as illustrated in FIG. 2. FIGS. 3-5 show signals of interest during climate control system operation. The climate control system may be operated according to the method of FIG. 6.

Referring now to FIG. 1, air conditioning system 100 includes an evaporator 8 for cooling vehicle cabin air. Air is passed over evaporator 8 via fan 50 and directed around vehicle cabin 2. Climate controller 26 operates fan 50 according to operator settings as well as climate sensors. Temperature sensor 4 provides an indication of the temperature of evaporator 8 to climate controller 26. Cabin temperature sensor 30 provides an indication of cabin temperature to climate controller 26. Similarly, humidity sensor 32 provides climate controller 26 an indication of cabin humidity. Sun load sensor 34 provides an indication of cabin heating from sun light to climate controller 26. Climate controller also receives operator inputs from operator interface 28 and supplies desired evaporator temperature and actual evaporator temperature to energy conversion device controller 12.

Operator interface 28 allows an operator to select a desired cabin temperature, fan speed, and distribution path for conditioned cabin air (e.g., conditioned fresh air or conditioned recirculated air). Operator interface 28 may include dials and push buttons to select climate settings. In some examples, operator interface 28 may accept inputs via a touch sensitive display.

Refrigerant is supplied to evaporator 8 via evaporator valve 20 after being pumped into condenser 16. Compressor 18 receives refrigerant gas from evaporator 8 and pressurizes the refrigerant. Heat is extracted from the pressurized refrigerant so that the refrigerant is liquefied at condenser 16. The liquefied refrigerant expands after passing through evaporator valve 20 causing the temperature of evaporator 8 to be reduced.

Compressor 18 includes a clutch 24, a displacement control valve 22, piston 80, and swash plate 82. Piston 80 pressurizes refrigerant in air conditioning system which flows from air conditioner compressor 18 to condenser 16. Swash plate 82 adjusts the stroke of piston 80 to adjust the pressure at which refrigerant is output from air conditioner compressor 18 based on oil flow through variable displacement control valve 22. Clutch 24 may be selectively engaged and disengaged to supply air conditioner compressor 18 with rotational energy from energy conversion device 10. In one example, energy conversion device 10 is an engine supplying rotational energy to compressor 18 and wheels 60 via transmission 70. In other examples, energy conversion device 10 is an electrical motor supplying rotational energy to air conditioner compressor 18 and wheels 60 via transmission 70. Rotational energy may be supplied to air conditioner compressor 18 from energy conversion device 10 via belt 42. In one example, belt 42 mechanically couples shaft 40 to climate control compressor 18 via clutch 24. Shaft 40 may be an engine crankshaft, armature shaft, or other shaft.

In this way, the system of FIG. 1 provides rotational energy to a climate control compressor to cool the cabin of a vehicle. Specifically, the air conditioner compressor provides a negative torque to load the energy conversion device and compress the refrigerant so that the refrigerant can be subsequently expanded in order to cool the vehicle cabin. The amount of negative torque provided to the energy conversion device by the air conditioner compressor can be adjusting via the clutch and an actuator or valve that adjusts the variable displacement pump.

Referring to FIG. 2, one example of an energy conversion device is shown. In particular, energy conversion device 10 is an internal combustion engine, comprising a plurality of cylinders, one cylinder of which is shown in FIG. 1, is controlled by electronic energy conversion device controller 12. Engine 10 includes combustion chamber 230 and cylinder walls 232 with piston 236 positioned therein and connected to shaft 40 which is a crankshaft. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. Alternatively, one or more of the intake and exhaust valves may be operated by an electromechanically controlled valve coil and armature assembly. The position of intake cam 251 may be determined by intake cam sensor 255. The position of exhaust cam 253 may be determined by exhaust cam sensor 257.

Fuel injector 266 is shown positioned to inject fuel directly into cylinder 230, which is known to those skilled in the art as direct injection. Alternatively, fuel may be injected to an intake port, which is known to those skilled in the art as port injection. Fuel injector 266 delivers liquid fuel in proportion to the pulse width of signal FPW from energy conversion device controller 12. Fuel is delivered to fuel injector 266 by a fuel system (not shown) including a fuel tank, fuel pump, and fuel rail (not shown). Fuel injector 266 is supplied operating current from driver 268 which responds to energy conversion device controller 12. In addition, intake manifold 244 is shown communicating with optional electronic throttle 262 which adjusts a position of throttle plate 264 to control air flow from air intake 242 to intake manifold 244. In one example, a low pressure direct injection system may be used, where fuel pressure can be raised to approximately 20-30 bar. Alternatively, a high pressure, dual stage, fuel system may be used to generate higher fuel pressures.

Distributorless ignition system 288 provides an ignition spark to combustion chamber 230 via spark plug 292 in response to energy conversion device controller 12. Universal Exhaust Gas Oxygen (UEGO) sensor 226 is shown coupled to exhaust manifold 248 upstream of catalytic converter 270. Alternatively, a two-state exhaust gas oxygen sensor may be substituted for UEGO sensor 226.

Converter 270 can include multiple catalyst bricks, in one example. In another example, multiple emission control devices, each with multiple bricks, can be used. Converter 270 can be a three-way type catalyst in one example.

Energy conversion device controller 12 is shown in FIG. 1 as a conventional microcomputer including: microprocessor unit 202, input/output ports 204, read-only memory 206, random access memory 208, keep alive memory 210, and a conventional data bus. Energy conversion device controller 12 is shown receiving various signals from sensors coupled to energy conversion device 10, in addition to those signals previously discussed, including: engine coolant temperature (ECT) from temperature sensor 212 coupled to cooling sleeve 214; a position sensor 284 coupled to an accelerator pedal 280 for sensing force applied by foot 282; a measurement of engine manifold pressure (MAP) from pressure sensor 222 coupled to intake manifold 244; an engine position sensor from a Hall effect sensor 218 sensing position of shaft 40; a measurement of air mass entering the engine from sensor 220; and a measurement of throttle position from sensor 258. Barometric pressure may also be sensed (sensor not shown) for processing by energy conversion device controller 12. In a preferred aspect of the present description, engine position sensor 218 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within the engine typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion. During the expansion stroke, the expanding gases push piston 236 back to BDC. Shaft 40 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

Figure 6:
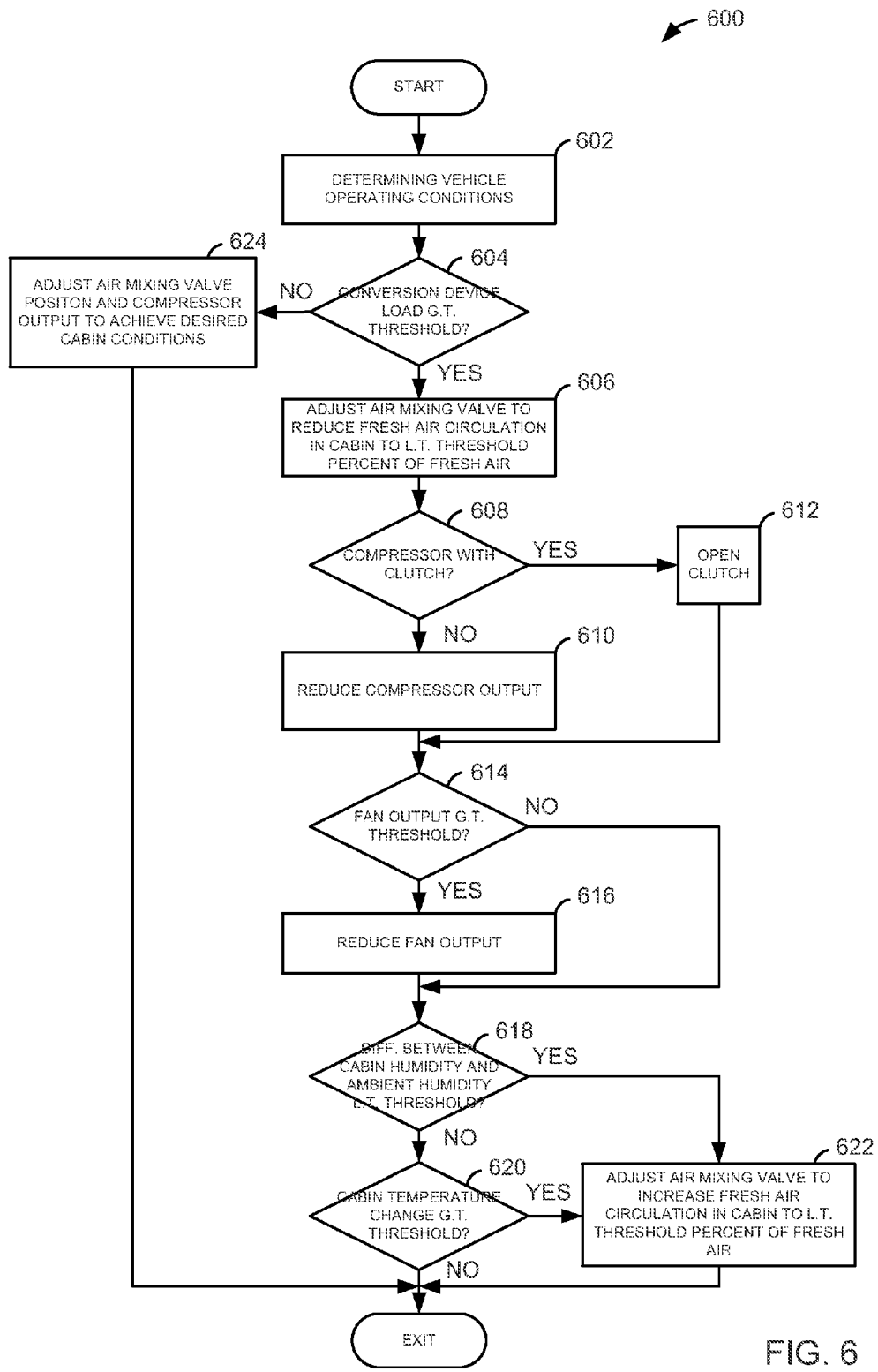
FIG. 6 is a vehicle climate control method.

Referring now to FIG. 3, a simulated operating sequence according to the method of FIG. 6 is shown. The sequence of FIG. 3 may be provided by the system shown in FIGS. 1 and 2 executing the method of FIG. 6 via instructions stored in non-transitory memory. FIG. 3 includes vertical markers $T_0$-$T_6$ that indicate times of particular interest during the sequence.

The first plot from the top of FIG. 3 is a plot of energy conversion device load versus time. Energy conversion device load increases in the direction of the Y axis arrow. Energy conversion device load may be in the form of a load demand from a device or controller. Alternatively, energy conversion device load may be measured via an air sensor when the energy conversion device is an internal combustion engine or via a current sensor when the energy conversion device is an electric motor. The X axis represents time and time increases from the left side of the figure to the right side of the figure. Dotted line 302 represents a threshold energy conversion device load above which adjustments are made to redirect output of the energy conversion device.

The second plot from the top of FIG. 3 is a plot of compressor clutch state versus time. The compressor clutch is closed or activated when the compressor trace is at a higher level as indicated at time $T_0$. The compressor clutch is open or deactivated when the compressor trace is at a lower level as indicated at time $T_4$. Rotational energy may be transferred to the compressor when the compressor clutch is closed. The X axis represents time and time increases from the left side of the figure to the right side of the figure.

The third plot from the top of FIG. 3 is a plot of air mixing valve position versus time. The air mixing valve 65 is substantially open to allow fresh air into the vehicle cabin when the air mixing valve position is at a higher level as indicated at time $T_0$. The air mixing valve 65 is closed when the air mixing valve is at a lower level as indicated between time $T_3$ and time $T_4$. It should be noted that in some examples, the air mixing valve 65 may not be completely closed to completely prevent fresh air from entering the cabin when the air mixing valve is shown in a closed position. For example, a small percentage of air being circulated in the cabin via the fan may be fresh air (e.g., less than 25% of air pumped by the fan). The X axis represents time and time increases from the left side of the figure to the right side of the figure.

The fourth plot from the top of FIG. 3 is a plot of cabin humidity versus time. Humidity increases in the direction of the Y axis arrow. Cabin humidity may be sensed or inferred. The X axis represents time and time increases from the left side of the figure to the right side of the figure. Dotted line 304 represents a threshold cabin humidity level above which adjustments are made to climate control system. In some examples, a change in cabin humidity exceeding a threshold level may be the basis for adjustments to the climate control system. In still other examples, adjustments to the climate control system may be provided in response to exceeding a cabin humidity level threshold and exceeding a level of change in cabin humidity.

The fifth plot from the top of FIG. 3 is a plot of cabin temperature versus time. Temperature increases in the direction of the Y axis arrow. Cabin temperature may be sensed or inferred. The X axis represents time and time increases from the left side of the figure to the right side of the figure. Dotted line 306 represents a threshold cabin temperature level above which adjustments are made to climate control system. In some examples, a change in cabin temperature exceeding a threshold level may be the basis for adjustments to the climate control system. In still other examples, adjustments to the climate control system may be provided in response to exceeding a threshold cabin temperature and exceeding a level of change in cabin temperature.

At time $T_0$, the energy conversion device load is low as are the cabin humidity and the cabin temperature. The compressor clutch is engaged and the compressor is operating. The air mixing valve is open so that a higher amount of air reaching the climate control system fan is fresh air (e.g., greater than 25% of air delivered to the cabin).

At time $T_1$, energy conversion device load has increased to a level exceeding threshold level 302. Therefore, the compressor clutch is opened and the air mixing valve is repositioned in response to the energy conversion device load exceeding the threshold level. Additional torque may be provided to vehicle wheels when the compressor clutch is opened. Thus, additional torque is available from the energy conversion device to meet loads other than the climate control system. Further, in some examples, the output of a climate control system fan may be decreased when the energy conversion device torque exceeds threshold level 302. Reducing fan speed can reduce current consumption and may extend the amount of time cabin air may be cooled via the evaporator. The cabin temperature and humidity are at lower levels when the compressor clutch is deactivated.

Alternatively, this same behavior can be triggered at low propulsive torques when it is desirable to enhance intake manifold vacuum levels transiently to provide vacuum to actuators such as a pneumatic brake booster. Lowering engine load by disengaging the air conditioner compressor or heat pump is an effective way of providing intake manifold vacuum for a brake booster or for an aspirator providing vacuum for a brake booster.

At time $T_2$, the energy conversion device load is reduced to a level less than threshold level 302. As a result, the compressor clutch is closed or reactivated and the air mixing valve is opened to allow fresh air into the vehicle cabin. The air mixing valve is opened at a first rate indicated at 310. The first rate may be a higher rate mixing valve closing rate so that cabin air may be quickly replaced by fresh conditioned air. The cabin temperature and humidity begin to decrease after the compressor is reactivated by closing the clutch. Of course, if the operator has recirculation mode already selected, no behavior change in the air conditioning system is noticeable.

At time $T_3$, the energy conversion device load increases to exceed threshold level 302. The compressor clutch is opened or deactivated and the air mixing valve is closed to reduce the amount of fresh air entering the cabin. Cabin humidity and temperature increase while the compressor clutch is opened.

Between time $T_3$ and time $T_4$, cabin humidity and temperature gradually increase as cooling of cabin air via the evaporator decreases. However, closing the air mixing valve increases the amount of time the evaporator can cool cabin air since the evaporator is doing less work extracting water vapor from air in the cabin as compared to if the evaporator were removing water vapor from fresh air.

At time $T_4$, cabin humidity exceeds threshold level 304 and cabin temperature continues to increase. In this example, the cabin temperature stays below the cabin temperature threshold 304. The compressor is not reactivated because energy conversion device load remains above threshold 302, but the air mixing valve is reopened to provide an additional amount of fresh air to the cabin. In some examples, the air mixing valve may be reopened when a change in cabin humidity exceeds a threshold level. Opening the air mixing valve may remove stale higher humidity air from the cabin. Further, the air mixing valve may be opened at a reduced rate as indicated at 312 so that cabin air is gradually replaced by ambient air. Note that the air mixing valve is opened faster at 310 than at 312.

At time $T_5$, energy conversion device load is decreased to less than threshold level 302. Consequently, the compressor clutch is closed to operate the compressor. The air mixing valve remains in the open position so that cabin air is refreshed with conditioned fresh air. The cabin temperature and humidity begin to decrease after the compressor clutch is engaged thereby activating the compressor.

At time $T_6$, energy conversion device load is again increased to a level greater than the threshold level 302. Therefore, the compressor clutch is deactivated and the air mixing valve is closed. The cabin humidity and temperature start to increase after the compressor is deactivated by opening the compressor clutch.

Referring now to FIG. 4, another simulated operating sequence according to the method of FIG. 6 is shown. The sequence of FIG. 4 may be provided by the system shown in FIGS. 1 and 2 executing the method of FIG. 6 via instructions stored in non-transitory memory. FIG. 4 includes vertical markers $T_0$-$T_6$ that indicate times of particular interest during the sequence. FIG. 4 includes the same plots as FIG. 3. Therefore, an explanation of the plots is omitted for the sake of brevity. An energy conversion device load threshold is indicated by dotted line 402. A cabin humidity threshold level is indicated by dotted line 404. A cabin temperature threshold level is indicated by dotted line 406.

At time $T_0$, the energy conversion device load is low and so are the cabin humidity and the cabin temperature. The compressor clutch is engaged (e.g., closed) and the compressor is operating. The air mixing valve is open so that a higher amount of air reaching the climate control system fan is fresh air (e.g., greater than 25% of air delivered to the cabin).

At time $T_1$, energy conversion device load has increased to a level exceeding threshold level 402. Therefore, the compressor clutch is opened and the air mixing valve is repositioned in response to the energy conversion device load exceeding the threshold level. Additional torque may be provided to vehicle wheels by the energy conversion device when the compressor clutch is opened since the load on the energy conversion device is lowered. In some examples, the output of a climate control system fan may be decreased when the energy conversion device torque exceeds threshold level 402. Reducing fan speed can reduce current consumption and may extend the amount of time cabin air may be cooled via the evaporator. The cabin temperature and humidity are at lower levels when the compressor clutch is deactivated.

At time $T_2$, the energy conversion device load is reduced to a level less than threshold level 402. As a result, the compressor clutch is closed or reactivated and the air mixing valve is opened to allow fresh air into the vehicle cabin. The air mixing valve is opened at a first rate indicated at 410. The first rate may be a higher mixing valve closing rate so that cabin air may be quickly replaced by fresh conditioned air. The cabin temperature and humidity begin to decrease after the compressor is reactivated by closing the clutch.

At time $T_3$, the energy conversion device load increases to exceed threshold level 402. The compressor clutch is opened or deactivated and the air mixing valve is closed to reduce the amount of fresh air entering the cabin. Cabin humidity and temperature increase while the compressor clutch is opened.

Between time $T_3$ and time $T_4$, cabin humidity and temperature gradually increase as cooling of cabin air via the evaporator decreases. However, closing the air mixing valve increases the amount of time the evaporator can cool cabin air since the evaporator is doing less work extracting water vapor from air in the cabin as compared to if the evaporator were removing water vapor from fresh air.

At time $T_4$, cabin temperature exceeds threshold level 404 and cabin temperature continues to increase. In this example, the cabin humidity level stays below the cabin humidity threshold 404. The compressor is not reactivated because energy conversion device load remains above threshold 402; however, the air mixing valve is reopened to provide an additional amount of fresh air to the cabin. In some examples, the air mixing valve may be reopened when a change in cabin temperature exceeds a threshold level. Opening the air mixing valve may reduce condensation in the cabin and remove stale higher humidity air from the cabin. Further, the air mixing valve may be opened at a reduced rate as indicated at 412 so that cabin air is gradually replaced by ambient air. Note that the air mixing valve is opened faster at 410 than at 412. In other examples, the air mixing valve may be held in a closed position until the load on the energy conversion device is less than a threshold or until a desired level of vacuum in a vacuum system is achieved.

At time $T_5$, energy conversion device load is decreased to less than threshold level 402. Consequently, the compressor clutch is closed to operate the compressor. The air mixing valve remains in the open position so that cabin air is refreshed with conditioned fresh air. The cabin temperature and humidity begin to decrease after the compressor clutch is engaged thereby activating the compressor.

At time $T_6$, energy conversion device load is again increased to a level greater than the threshold level 402. Therefore, the compressor clutch is deactivated and the air mixing valve is closed. The cabin humidity and temperature start to increase after the compressor is deactivated by opening the compressor clutch.

Referring now to FIG. 5, another simulated operating sequence according to the method of FIG. 6 is shown. The sequence of FIG. 5 may be provided by the system shown in FIGS. 1 and 2 executing the method of FIG. 6 via instructions stored in non-transitory memory. FIG. 5 includes vertical markers $T_0$-$T_6$ that indicate times of particular interest during the sequence. FIG. 5 includes the same plots as FIG. 3 with the exception of compressor displacement replaces compressor clutch state. Therefore, an explanation of similar plots is omitted for the sake of brevity. An energy conversion device load threshold is indicated by dotted line 502. A cabin humidity threshold level is indicated by dotted line 504. A cabin temperature threshold level is indicated by dotted line 506.

The second plot from the top of FIG. 5 represents compressor displacement versus time. Compressor displacement increases in the direction of the Y axis arrow. Time increases in the direction of the X axis arrow. The compressor output increases as the compressor displacement increases.

At time $T_0$, the energy conversion device load is low and so are the cabin humidity and the cabin temperature. The compressor displacement is at a high level so compressor output is at a high level. The air mixing valve is open so that a higher amount of air reaching the climate control system fan is fresh air (e.g., greater than 25% of air delivered to the cabin).

At time $T_1$, energy conversion device load has increased to a level exceeding threshold level 502. Therefore, the compressor displacement is reduced to lower compressor output and compressor negative torque in response to the energy conversion device load exceeding the threshold level. Additional torque may be provided to vehicle wheels by the energy conversion device when the compressor displacement is reduced or the compressor clutch is opened since the load on the energy conversion device is lowered. The compressor displacement is shown being reduced at a gradual rate so as to increase the amount of time the evaporator can cool cabin air. In one example, the compressor displacement reduction rate may be reduced at a rate that is dependent on the energy conversion torque demand. For example, as the rate of energy conversion torque demand increases, the rate of compressor displacement may be reduced. In in some examples, the output of a climate control system fan may be decreased when the energy conversion device torque exceeds threshold level 502. Reducing fan speed can reduce current consumption and may extend the amount of time cabin air may be cooled via the evaporator. The cabin temperature and humidity are at lower levels when the compressor clutch is deactivated. In some examples, the air mixing valve may be closed every time the air conditioner clutch is commanded off or if its displacement is reduced.

At time $T_2$, the energy conversion device load is reduced to a level less than threshold level 502. Consequently, the compressor displacement is increased and the air mixing valve is opened to allow fresh air into the vehicle cabin. The air mixing valve is opened at a first rate indicated at 510. The first rate may be a higher mixing valve closing rate so that cabin air may be quickly replaced by fresh conditioned air. The cabin temperature and humidity begin to decrease after the compressor displacement is increased.

At time $T_3$, the energy conversion device load increases to exceed threshold level 502. The compressor displacement is decreased and the air mixing valve is closed to reduce the amount of fresh air entering the cabin. Cabin humidity and temperature increase while the compressor displacement is reduced.

Between time $T_3$ and time $T_4$, cabin humidity and temperature gradually increase as cooling of cabin air via the evaporator decreases. The compressor displacement is gradually reduced rather than in a step wise manner. The air mixing valve is closed to increase the amount of time the evaporator can cool cabin air since the evaporator is doing less work extracting water vapor from air in the cabin as compared to if the evaporator were removing water vapor from fresh air.

At time $T_4$, cabin humidity level exceeds threshold level 504 and cabin temperature continues to increase. In this example, the cabin temperature level stays below the cabin temperature threshold 506. The compressor displacement is not increased because energy conversion device load remains above threshold 502; however, the air mixing valve is reopened to provide an additional amount of fresh air to the cabin. In some examples, the air mixing valve may be reopened when a change in cabin humidity exceeds a threshold level. Opening the air mixing valve may reduce condensation in the cabin and remove stale higher humidity air from the cabin. Further, the air mixing valve may be opened at a reduced rate as indicated at 512 so that cabin air is gradually replaced by ambient air. Note that the air mixing valve is opened faster at 510 than at 512.

At time $T_5$, energy conversion device load is decreased to less than threshold level 502. Consequently, the compressor displacement is increased to raise compressor output. The air mixing valve remains in the open position so that cabin air is refreshed with conditioned fresh air. The cabin temperature and humidity begin to decrease after the compressor displacement is increased thereby elevating compressor output.

At time $T_6$, energy conversion device load is again increased to a level greater than the threshold level 502. Therefore, the compressor displacement is decreased to lower compressor output. The cabin humidity and temperature start to increase after the compressor is deactivated by opening the compressor clutch.

Thus, an operating state of a climate control compressor may be adjusted in response to energy conversion device torque while an air mixing valve state may be adjusted in response to energy conversion device state, cabin humidity, change in cabin humidity, change in cabin temperature, and cabin temperature.

Referring now to FIG. 6, a method for operating a climate control system is shown. The method of FIG. 6 is executable via instructions stored in the system of FIGS. 1 and 2. The instructions may be stored in a non-transitory medium. The method of FIG. 6 may provide the sequences shown in FIGS. 3-5.

At 602, method 600 determined vehicle operating conditions. Vehicle operating conditions may include but are not limited to cabin temperature, cabin humidity, energy conversion device torque, and energy conversion device torque demand. Method 600 proceeds to 604 after vehicle operating conditions are determined.

At 604, method 600 judges whether or not energy conversion device load is greater than a threshold load. The energy conversion device load may be determined via a load command such as a demand torque or via monitoring a parameter such as engine air charge or motor current. If the energy conversion device load is greater than a threshold load, the answer is yes and method 600 proceeds to 606. Otherwise, the answer is no and method 600 proceeds to 624.

At 624, method 600 adjusts a position of an air mixing valve and compressor output to provide desired cabin conditions (e.g., desired temperature and humidity). In one example, compressor displacement is increased to provide additional cooling to cabin air. In another example, a compressor clutch may be engaged to increase compressor output. Additionally, the compressor clutch may be cycled on and off to meet cabin cooling demand. The air mixing valve is also opened to provide more than 25% of air entering the climate control system fan from outside the cabin (e.g., fresh air). Method 600 proceeds to exit after the compressor state and air mixing valve state are adjusted.

At 606, method 600 adjusts the air mixing valve state to reduce the amount of fresh air brought into the cabin. In one example, the position of the air mixing valve may be adjusted to close the air mixing valve such that less than 25% of air reaching the climate control system fan is fresh air. In other examples, the air mixing valve is adjusted so that less than 5% of air reaching the climate control system fan is fresh air (e.g., air drawn from outside the cabin). In still other examples, the air mixing valve is closed to the extent possible given actuator linkages and stops limiting the closing amount of the air mixing valve. Method 600 proceeds to 608 after the state of the air mixing valve is adjusted.

At 608, method 600 judges whether or not the climate control compressor includes a clutch. In one example, a location in controller memory may contain a variable that indicated the type of compressor (e.g., a compressor with a clutch or a compressor without a clutch). If method 600 judges the compressor has a clutch, the answer is yes and method 600 proceeds to 612. If method 600 judges the compressor does not have a clutch, the answer is no and method 600 proceeds to 610

In some examples, where the compressor includes both a clutch and variable displacement (e.g., swash plate), method 600 proceeds to 612 when energy conversion device load is greater than a second threshold level. If energy conversion device load is between the threshold of 604 and the second threshold, method 600 proceeds to 610.

At 612, method 600 opens the compressor clutch to reduce the climate control load on the energy conversion device. The load or torque decrease from opening the compressor clutch may be provided to vehicle wheels. Method 600 proceeds to 614 after the compressor clutch is opened.

At 610, method 600 reduces compressor output. In one example, compressor output is reduced via reducing compressor displacement by adjusting a position of a swash plate. The reduction in compressor output may be based on an amount of energy conversion device load that is greater than a threshold energy conversion device load. For example, if an energy conversion device threshold load is 250 N-m and the energy conversion device load or demand is at 255 N-m, the compressor displacement may be reduce to provide 5 N-m less of negative torque. Method 600 proceeds to 614 after compressor output is reduced.

At 614, method 600 judges whether or not output of a fan directing air over an evaporator is greater than a threshold amount. If so, the answer is yes and method 600 proceeds to 616. If not, the answer is no and method 600 proceeds to 618. The threshold fan output may be in cubic meters per minute, and the threshold fan amount may vary for operating conditions. For example, at a first ambient air temperature and a first ambient humidity level, the fan output threshold may be a first amount. At a second ambient air temperature and second ambient humidity level, the fan output threshold may be a second amount. The second fan output threshold amount may be greater than the first fan output threshold amount when the second ambient temperature and the second ambient humidity are greater than the first ambient temperature and the first ambient humidity.

At 616, method 600 reduces fan output. Fan output may be reduced via lowing current supplied to the fan. In one example, the average amount of current supplied to the fan may be reduced via pulse width modulating a voltage applied to the fan. Method 600 proceeds to exit after fan output is reduced.

At 618, method 600 judges whether or not a difference in cabin humidity and ambient humidity is less than a threshold. If the humidity difference is less than a threshold level, the answer is yes and method 600 proceeds to 622. Otherwise, the answer is no and method 600 proceeds to 620. In other examples, method 600 judges whether or not a change and/or cabin humidity level is greater than threshold values. If so, the answer is yes and method 600 proceeds to 622. Otherwise, the answer is no and method 600 proceeds to 620. Different thresholds for cabin humidity and change in cabin humidity may be provided. For example, a change in humidity threshold may be 15% whereas a humidity threshold may be 75% relative humidity.

At 620, method 600 judges whether or not cabin temperature change and/or cabin temperature level are greater than threshold values. If so, the answer is yes and method 600 proceeds to 622. Otherwise, the answer is no and method 600 proceeds to exit. Different thresholds for cabin temperature and change in cabin temperature may be provided. For example, a change in temperature threshold may be 7° C. whereas the temperature threshold may be 28° C.

At 622, method 600 adjusts the state of the air mixing valve. In one example, the air mixing valve is at least partially closed so that the percent of fresh air introduced to the cabin is less than a threshold percent of air flowing through the climate control fan to the evaporator. For example, fresh air entering a fan having output of 100 cubic feet per minute (CFM) may be limited to 20 CFM or 20% of flow through the fan. Thus, the air mixing valve is closed to a position that provides less than a threshold amount of air entering a fan. The air mixing valve position may be a predetermined valve position. In some examples, the air mixing valve may be completely closed. In other examples, the air mixing valve may be closed to an extent that physical stops within the air mixing valve allow. Method 600 proceeds to exit after the position of the air mixing valve is adjusted.

Thus, the method of FIG. 6 provides for controlling a vehicle climate system, comprising: adjusting an air mixing valve state and a compressor in response to an energy conversion device load greater than a threshold. In this way, vehicle cabin air may be conditioned for a longer time period after output of a compressor is reduced. The method includes where the air mixing valve state and the compressor are adjusted contemporaneously and further comprising adjusting the air mixing valve state and compressor in response to a vacuum level in a vacuum system that is less than a threshold vacuum. The method also includes where the energy conversion device load is requested at least in part by a driver, and where output of a energy conversion device is adjusted in response to the energy conversion device load. In one example, the energy conversion device is an electric motor. In another example, the energy conversion device is an internal combustion engine. The method includes where cabin air is circulated via the air mixing valve where air circulated via the fan is comprised of air comprised of less than a threshold percentage of fresh after adjusting the mixing valve state. The method further includes where output of the air conditioner is decreased in response to the energy conversion device load.

The method of FIG. 6 also provides for controlling a vehicle climate system, comprising: adjusting an air mixing valve to a first air mixing valve state and a compressor to a first compressor state in response to a energy conversion device load greater than a threshold; and adjusting the air mixing valve to a second air mixing valve state in response to an environmental condition of a vehicle cabin while the compressor is in the first state. The method includes where the first air mixing valve state comprises an air mixing valve position that provides for circulation of air in the cabin via a fan where the air flowing though the fan is comprised of less than a threshold percentage of fresh air drawn from outside the cabin. The method includes where the threshold percentage is less than 25%. The method also includes where the first compressor state provides a lower compressor output than before the compressor is adjusted in response to the energy conversion device load. In other words, the compressor output is reduced in response to the energy conversion device load exceeding a threshold.

In some examples, the method includes where the environmental condition is an amount of humidity in the vehicle cabin. Further, the method includes where the environmental condition is a temperature in the vehicle cabin. The method further comprises adjusting the compressor to a second compressor state in response to a reduction in the energy conversion device load. For example, the compressor output may be increased when energy conversion device load is decreased after the energy conversion device load exceeded a threshold. The method includes where the compressor is an air conditioner compressor, and where the second compressor state provides a higher compressor output than the first compressor state.

In another example, the method of FIG. 6 provides for controlling a vehicle climate system, comprising: adjusting an air mixing valve state, a fan state, and a compressor state in response to a vehicle operating condition; and increasing vehicle wheel torque in response to the vehicle operating condition. The method includes where adjusting the compressor state reduces an output of the compressor and where the vehicle operating condition is an intake manifold pressure greater than a threshold or a vacuum level in a vacuum system less than a threshold level. For example, if a vacuum threshold level is 8 In—Hg and vacuum level in a vacuum system is 6 In—Hg, the air mixing valve may be closed in response to the vacuum being less than the threshold level.

In another example, the method includes adjusting the fan state to reduce output of the fan. The method also includes where adjusting the mixing valve state reduces a percentage of fresh air circulating in a vehicle cabin. The method also includes where adjusting the compressor state gradually reduces a compressor output over time.

Note that there is no driver or operator command to close the air mixing valve in the sequences shown in FIGS. 3-5. Thus, the control actions may be performed without driver or operator input. Further, the method of FIG. 6 controls the fan, compressor state, and air mixing valve state without a direct operator input (e.g., changing a parameter or input such as a mixing valve recirculation button that has a sole function of adjusting a state of a climate control device) to control the states of the respective devices. For example, the method of FIG. 6 may close the air mixing valve in response to the energy conversion device when there is no operator input to the climate control system to adjust the state of the compressor, air mixing valve, and fan. In a case where the operator does change an input of the climate control system, the climate control system may follow the operator command.

As will be appreciated by one of ordinary skill in the art, routines described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling a vehicle climate system, comprising:
   adjusting an air mixing valve state, a fan state, and a compressor state in response to a vehicle operating condition, where adjusting the air mixing valve state includes closing an air mixing valve to decrease fresh air flow into a vehicle cabin, where adjusting the fan state reduces an output of a fan, where the vehicle operating condition is a torque request exceeding a threshold torque, and where the air mixing valve is opened while the torque request exceeds the threshold torque;
   increasing vehicle wheel torque in response to the vehicle operating condition; and
   opening the air mixing valve in response to vehicle cabin humidity exceeding a threshold; and
   further comprising opening the air mixing valve at a first rate in response to the torque request decreasing to less than the threshold torque, and where the air mixing valve is opened at a second rate in response to the vehicle cabin humidity exceeding the threshold, the second rate slower than the first rate.

2. The method of claim 1, where adjusting the compressor state gradually reduces a compressor output over time.

* * * * *